Figure 1:
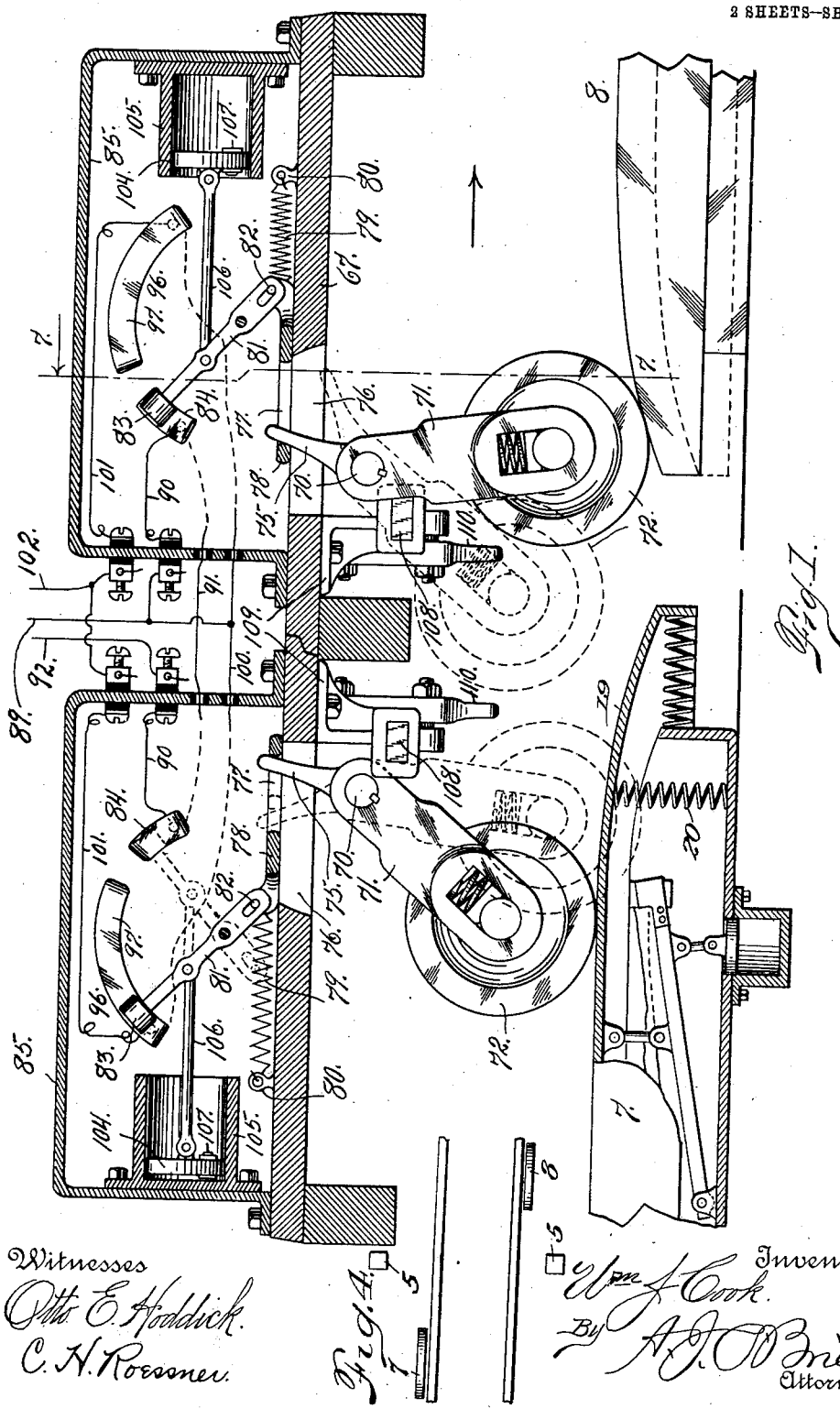

W. J. COOK.
RAILWAY SIGNALING APPARATUS.
APPLICATION FILED MAR. 4, 1911.

1,090,455.

Patented Mar. 17, 1914.
2 SHEETS—SHEET 2.

Witnesses
Otto E. Hoddick.
C. H. Roessner.

Inventor
Wm. J. Cook.
By A. J. O'Brien
Attorney

UNITED STATES PATENT OFFICE.

WILLIAM J. COOK, OF DENVER, COLORADO, ASSIGNOR TO THE COOK RAILWAY SIGNAL COMPANY, OF DENVER, COLORADO, A CORPORATION OF COLORADO.

RAILWAY SIGNALING APPARATUS.

1,090,455.  Specification of Letters Patent.  Patented Mar. 17, 1914.

Application filed March 4, 1911. Serial No. 612,349.

*To all whom it may concern:*

Be it known that I, WILLIAM J. COOK, a citizen of the United States, residing in the city and county of Denver and State of Colorado, have invented certain new and useful Improvements in Railway Signaling Apparatus; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates generally speaking to railway signaling apparatus, but more specifically to means for automatically operating signals in the locomotive cab for the purpose of warning the engineer to look for signals along the track.

This invention is adapted for use in connection with railway signaling systems having signals arranged along the track and adapted to be automatically operated by passing trains. My improved construction is so arranged and located that normally a green or safe light is displayed in the cab. However, just before the train reaches a track signal, the mechanism carried by the train is automatically operated to break the green or safe light circuit in the cab and close an alarm or warning circuit in which a visible signal, as a red lamp, and an audible signal as a bell, are both located. As soon as these warning signals are given the engineer knows that he is approaching a track signal and that he must be on the lookout to determine whether the track signal is in position to indicate a clear track or danger.

More specifically my improved construction consists of depending members mounted upon the truck of the locomotive and arranged by the engagement of suitable devices arranged along the track, to be so actuated as to break the safe circuit in the cab and close the warning circuit, the said track devices being suitably mounted with reference to the track signals to accomplish the aforesaid object of warning the engineer. The depending members carried by the locomotive also serve to simultaneously set track signals such as semaphores or lamps or any other known form of signals. The locomotive is equipped with two depending members, one on each side, adapted to engage the track devices on opposite sides of the track. The one of these devices on the left-hand side of the track is adapted to operate the warning signals in the cab as the train approaches a track signal. This is accomplished by virtue of the fact that the depending member is adapted to run on top of the track device for setting the track signals, but cannot depress the same for the purpose of changing the track signals; while the depending member on the opposite side of the locomotive is rigidly held in place, whereby the track device for setting the track signals is actuated by depressing a vertically movable member.

Having briefly outlined my improved construction, I will proceed to describe the same in detail, reference being made to the accompanying drawing in which is illustrated an embodiment thereof.

Figure 2:
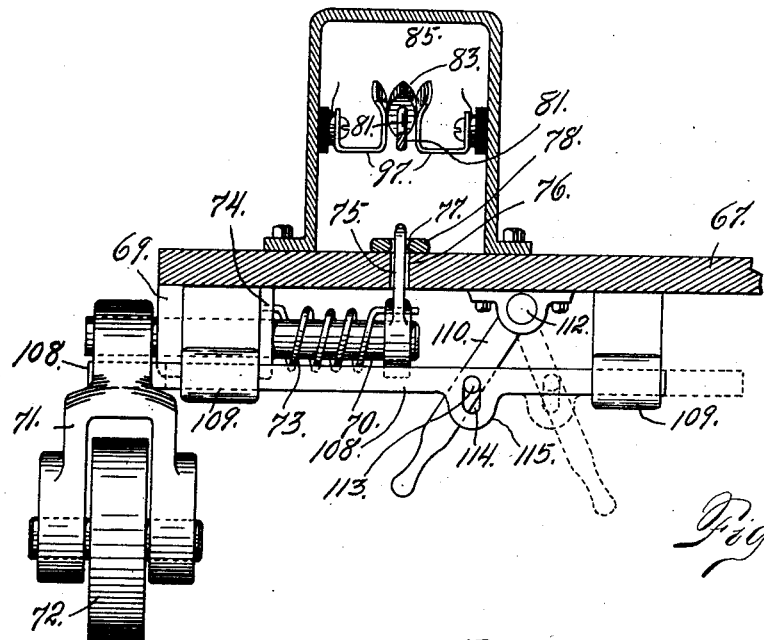
Figure 3:
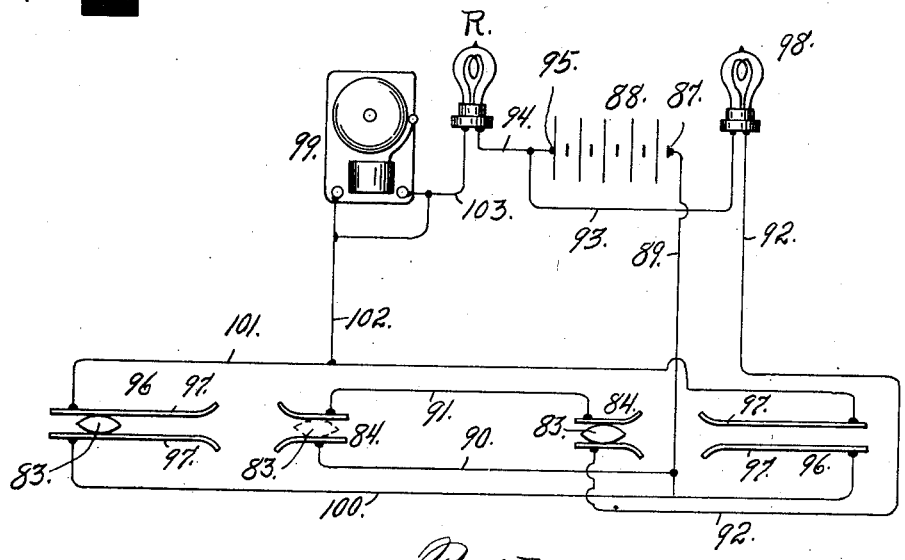

In this drawing: Figure 1 is a sectional view illustrating the mechanism carried by the locomotive for operating the cab warning signals and the track signals. Fig. 2 is a cross section of the same taken on the line 7—7, Fig. 1, looking toward the left. Fig. 3 is a diagrammatic view illustrating the cab warning signals and the mechanism for making and breaking the same. Fig. 4 is a diagrammatic view showing the arrangement of the track contacts and signals with relation to the track.

The same reference characters indicate the same parts in all the views.

Let the numerals 7 and 8 designate track signal setting devices, one arranged in advance of the other along the track. These devices are located along both sides of the track at suitable intervals for signaling purposes, 7 being upon the left and 8 upon the right-hand side of the track looking in the direction of the arrow, Fig. 1. The tops 19 of the contact devices 7 and 8 are supported by springs 20 and are vertically slidable. When in the depressed position they either make or break circuits for operating track signals 5.

It should be here explained that the means carried by the train for giving the warning signals in the cab are so arranged that while the cab signals are operated while passing the track signal setting device on the left-hand side of the track, the last named device is not itself operated. On the contrary the mechanism carried by the train is also so arranged that it actuates the track signal setting device on the right-hand side of the track, but does not serve to operate the warning signals in the cab. This mechanism carried by the train will now be described in detail.

Referring now more particularly to Fig. 1, let the numeral 67 designate the truck frame of the locomotive, which is equipped with a depending bearing 69, in which is mounted a journal 70 to which is made fast a depending bifurcated bracket 71 carrying a wheel 72. The wheel and its bracket 72 are normally held in a suitable position by virtue of a coil spring 73 secured at one extremity to a stationary part as shown at 74, while its opposite extremity is secured to a crank arm 75 fast on the journal 70 and protruding through a slot 76 formed in the truck frame, and also entering a slot 77 formed in a plate 78 slidably mounted on the truck frame and normally held in the position shown at the right of Fig. 1 by a spring 79, one extremity of which is connected with a stationary part of the frame as shown at 80. Pivotally connected as shown at 82 with one extremity of the plate 78, is a switch arm 81 whose opposite extremity carries a contact member 83 normally in engagement with a stationary contact 84 mounted upon and within a casing 85 carried by the truck frame. The contact 84 is composed of two members 97 between which the contact extremity 83 of the arm 81 passes when in its normal position. Attention is called to the fact that this contact mechanism, as well as the arm 81 and all parts connected therewith, is duplicated on the truck frame (see Fig. 1), and the two arms 81 are normally in engagement with their respective contacts 84. This must be understood in order that the circuit may be traced through a green lamp 98 in the cab (see Fig. 3). Now assuming that one contact arm 81 is in the full line position in Fig. 1 and the other in the dotted line position, both positions being normal, the circuit may be traced (see Fig. 3) from a pole 87 of an electrical source 88 carried by the train, through a wire 89, thence through a wire 90, through the contact 84 farther to the left in Figs. 1 and 3, thence through the contact extremity 83 of a second contact arm 81 which bridges the space between the two members 97 of the said contact, thence through a conductor 91, to the contact 84 farther to the right in the said figures, thence through the contact extremity 83 of the arm 81 farther to the right, thence through a conductor 92 to the lamp 98, and thence from said lamp through a conductor 93 and a conductor 94 to the opposite pole 95 of the source, completing the circuit. Now if we assume that a train is traveling toward the right, referring to Fig. 1, and encounters the track setting device 7 on the left-hand side of the track, the depending actuating member 71 on that side of the track will be raised by the track signal setting device 7, and as it is raised it will move its journal 70 a sufficient distance to cause its crank arm 75 to actuate its plate 78 and throw the contact arm 81 out of engagement with the contact 84 and into engagement with a relatively new contact 96 composed of two members 97, the said members being bridged by the contact extremity 83 of the said arm. This movement of the arm 81 breaks the circuit through the green or safe lamp 98 in the cab and closes the circuit through a red light R and a bell 99 in the cab. This circuit may be traced as follows: from the pole 87 of the battery 88, through the conductor 89 to a conductor 100, thence through the members 97 of the contact 96, the same being bridged by the contact extremity 83 of the arm 81, through a conductor 101 and conductor 102, to and through the bell 99, thence through a conductor 103 to the red lamp R, and thence through a conductor 94 to the opposite pole 95, completing the circuit.

When the arm 81 is actuated to close the circuit through the alarm devices in the cab, a piston 104 is moved into a dash pot 105, since the said piston is connected by means of a stem 106 with the arm 81. This piston has a check valve 107 to allow it to enter the dash pot freely, but retarding its return sufficiently to prolong the operation of the bell and red lamp the necessary length of time to give the engineer the required notice that the train is approaching a track signal. As soon, however, as the train has passed the track signal setting device 7, the depending member swings to the position shown by dotted lines at the left of Fig. 1, and the tension of the spring 79 serves to return the plate 78 and the arm 81 to its normal position as soon as the retarding influence of the dash pot can be overcome.

Each of the depending members is held in its normal position when traveling in one direction, by a bar 108 which is slidably mounted in bearings 109 depending from the truck frame. The bar which controls the depending device on the right-hand side of the train, is located in the rear of the bracket 71, and when the said bracket is in its normal position it rests against said bar. Now as the wheel 72 of this bracket engages one extremity of the track setting device 8, the depending member cannot swing rearwardly, but is held rigid in its normal position, and instead of traveling up the incline from the extremity of the track signal setting device 8, it forces the member 19 of said device downwardly, thus operating the track signals as heretofore indicated. Again, the bar 108 which controls the depending member on the left-hand side of the track, is located forward of said member so that when the said member encounters the track signal setting device 7, it swings away from the bar 108 and instead of forcing the movable member 19 downwardly, it has no effect upon said member, as its weight is not sufficient to overcome the tension of the springs 20; and the movement of this depending member from the position shown in dotted lines in Fig. 1 to the position shown in full lines, actuates the plate 78 and its connections to throw the contact extremity 83 of the arm 81 farther to the left, from engagement with the contact 84 into engagement with the contact 96, closing the circuit through the warning signals of the cab, and warning the engineer for the purpose heretofore explained.

Attention is called to the fact that the two depending members, being reversely arranged with reference to the bars 108, serve respectively to actuate the track signal setting devices along the track and the warning signals in the cab, when the train is traveling in a given direction. However, if the train were backing up, the functions of the two depending members and their connections would be reversed, since in that event the depending member farther to the right would swing away from its bar 108 and thus operate the warning signals in the cab; while the depending member farther to the left would be rigidly held in its normal position and caused to depress the movable member 19 of the track signal setting device and operate the track signals in the manner heretofore explained.

Should it be desired to throw the depending members out of commission for track signal setting purposes, the bars 108 may be shifted from the full line position to the dotted line position (see Fig. 2), since the bars 108 are slidably mounted in their bearings and this endwise movement is accomplished by means of a lever arm 110 pivoted at 112 and connected with the bar 108 by means of a pin 113 passing through a slot 114 formed in a reinforced part 115 of the bar.

Having thus described my invention, what I claim is:

1. In railway signaling apparatus, the combination with warning signals carried by the train, of two sets of make-and-break devices mounted on the train in multiple for closing the circuit to operate said signals, two operating devices carried by the train and respectively connected with the two sets of make-and-break devices, the operating devices being movable in opposite directions to actuate the make-and-break devices, means for locking each operating device against movement in one direction, and projections arranged along the track in the path of the respective operating devices, one of the operating devices being actuated by one set of projections when the train is traveling forwardly, and the other device by the other set of projections when the train is traveling rearwardly.

2. In railway signaling apparatus, the combination with warning signals carried by the train, of two sets of make-and-break devices mounted on the train in multiple for closing the circuit to operate said signals, two operating devices carried by the train and respectively connected with the two sets of make-and-break devices, the operating devices being movable in opposite directions to actuate the make-and-break devices, means for locking each operating device against movement when the other operating device is actuated, and projections arranged along the track in the path of the respective operating devices, one of the operating devices being actuated by one set of projections when the train is traveling forwardly, and the other device by the other set of projections when the train is traveling rearwardly, each projection having a top yielding member which is depressed by the operating device which is locked against movement when traveling in either direction.

3. The combination of warning and safe signals carried by the train, an electrical circuit normally closed through the safe signal and broken through the warning signal, make-and-break devices carried by the train and located in the signaling circuit, means carried by the train and connected in operative relation with the make-and-break devices for actuating the latter when the train is traveling both forwardly and rearwardly, each operating device being locked against movement when the other operating device is actuated, and projections having yielding top members arranged in the path of each operating device, the yielding member being sufficiently rigid to move the unlocked operating device, and sufficiently yielding to be depressed by the locked operating device.

4. In railway signaling apparatus, the combination with a make-and-break device mounted on the train, of an operating device pivoted upon the train and connected at its upper extremity with the make-and-break device, the operating device being movable in one direction from its normal position for actuating the make-and-break device, projections arranged along the track in the path of the operating device, each projection having a top yielding member and means for locking said operating device against movement in one direction whereby when it strikes one of said projections the yielding top of the latter will be depressed.

5. In combination with a warning signal carried by a train, a make-and-break device carried by the train, a normally open electric circuit through the said signal and make-and-break device, means carried by the train and connected in operative relation with the make-and-break device, a projection having a yielding top member located near the track in the path of said means whereby when the train is moving in one direction said means is shifted to operate the make-and-break device to close the circuit, and a lock for preventing the movement of said means in the opposite direction whereby when the train is moving in a reverse direction said yielding top member will be depressed.

In testimony whereof I affix my signature, in presence of two witnesses.

WILLIAM J. COOK.

Witnesses:
 HORTENSE UHLRICH,
 ELIZABETH BOWEN.

Copies of this patent may be obtained for five cents each, by addressing the "Commissioner of Patents, Washington, D. C."